(12) United States Patent
Kikuchi (10) Patent No.: US 6,671,464 B1
(45) Date of Patent: Dec. 30, 2003

(54) POLARIZATION MODE DISPERSION COMPENSATOR AND COMPENSATION METHOD

(75) Inventor: Nobuhiko Kikuchi, Nerima-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/349,201

(22) Filed: Jul. 7, 1999

(30) Foreign Application Priority Data

Jul. 7, 1998 (JP) .......................................... 10-207240

(51) Int. Cl.⁷ .............................................. H04B 10/08
(52) U.S. Cl. .............................. 398/65; 385/11; 398/81; 398/136; 398/147; 398/152
(58) Field of Search ................................ 359/110, 122, 359/124, 153, 156, 161, 177, 65, 68, 81, 119, 136, 147, 148, 152, 158; 385/11

(56) References Cited

U.S. PATENT DOCUMENTS

| | | | | |
|---|---|---|---|---|
| 5,124,828 A | * | 6/1992 | Mahon | 359/192 |
| 5,295,013 A | * | 3/1994 | Ono | 359/192 |
| 5,696,614 A | * | 12/1997 | Ishikawa et al. | 359/124 |
| 5,949,560 A | * | 9/1999 | Roberts et al. | 359/110 |
| 5,965,874 A | * | 10/1999 | Aso et al. | 356/364 |
| 6,339,489 B1 | * | 1/2002 | Bruyere et al. | 359/156 |
| 6,342,961 B1 | * | 1/2002 | Bergano et al. | 359/124 |

* cited by examiner

Primary Examiner—Brent A. Swarthout
(74) Attorney, Agent, or Firm—Antonelli, Terry, Stout & Kraus, LLP

(57) ABSTRACT

The present invention offers a polarization mode dispersion compensator and a compensation method for polarization mode dispersion having simple constitution and being strong against external disturbances. The polarization mode dispersion compensator, a representative example of the present invention, is provided with a compensation circuit for polarization mode dispersion, a degree of polarization measuring circuit, and a control circuit. An optical signal is input to the compensation circuit for polarization mode dispersion through an optical fiber, and after the process of compensation for polarization mode dispersion, it is output to an optical fiber. An optical coupler divides a part of the optical signal passing through the optical fiber. The degree of polarization measuring circuit finds the degree of polarization of the divided optical signal. The control circuit generates a control signal based on the degree of polarization obtained in the above, and so controls the compensation circuit for polarization mode dispersion as to make the degree of polarization maximum.

5 Claims, 7 Drawing Sheets

FIG. 4B (PMD=60ps)

POLARIZATION MODE DISPERSION COMPENSATOR AND COMPENSATION METHOD

BACKGROUND OF THE INVENTION

1. Field of the Invention

The present invention relates to a polarization mode dispersion compensator for compensating waveform distortion of an optical signal due to polarization mode dispersion received in an optical transmission line and a compensation method for polarization mode dispersion.

2. Description of the Related Art

With the advance of construction of optical fiber communication networks, still higher speed transmission is required. For the development of high speed transmission various kinds of studies are being performed; however, as one of the causes hindering the development of high speed transmission, the polarization mode dispersion in an optical transmission line is at issue. PMD (Polarization Mode dispersion) is a phenomenon in which transmission delays in 2 polarization eigen modes to be the principal axes are different, in a case where an optical fiber or an optical device to be used in a transmission line has polarization depenence. The difference in transmission delays between the 2, $\Delta T$, expresses the amount of polarization mode dispersion. The waveform of a received optical signal is observed as the sum of 2 waveforms, so that the waveform of the received optical signal is distorted. Thereby, the eye-pattern of the received waveform is also largely distorted and can cause a big problem such as impossibility of transmission or degradation of transmission characteristics, degradation of receiving sensitivity, etc. The principal axes of polarization or the amount of polarization dispersion of a transmission line is varied by the pressure or vibration given to an optical fiber, the environmental temperature, so that the quantity of degradation due to polarization mode dispersion also varies every moment. several compensation methods as countermeasures against polarization mode dispersion have been proposed. For example, in the paper, T. Takahashi, etc., "Automatic Compensation technique for timewise fluctuating polarization mode dispersion in in-line amplifier systems," IEE Electronics Letters, Vol. 30, No. 4, February, 1994, pp 348–349, an optical compensation method for polarization mode dispersion is proposed. In this method, an optical signal degraded by polarization mode dispersion is received by an optical receiver through a compensation circuit for polarization mode dispersion. The compensation circuit for polarization mode dispersion is provided with a polarization controlling optical circuit and a polarization maintaining fiber for the polarization mode dispersion compensation, and the polarization state of an optical signal is controlled by the polarization controlling optical circuit and the incident state onto the polarization mode maintaining fiber for the polarization mode dispersion for the compensation is varied; thereby, the waveform distortion of the optical signal received during the transmission by polarization mode dispersion is canceled.

The control of the compensation circuit for polarization mode dispersion is executed as shown below. At first, a part of the output light from the compensation circuit for polarization mode dispersion is divided by an optical coupler and converted into an electrical signal by an optoelectric converter (O/E). After that, the magnitude of a frequency component of Rb/2 in the signal spectrum is observed by a frequency detector (center frequency: Rb/2; Rb: the bit rate of the transmitted signal). The state of the polarization controlling optical circuit is controlled to make the output signal of the frequency detector maximum by a maximum control circuit. The magnitude of the frequency component of Rb/2 in the signal spectrum becomes smaller as the eye-opening is made smaller by the degradation of the waveform due to polarization mode dispersion. Therefore, it is always possible to perform compensation for making the quantity of degradation of a received optical signal due to polarization mode dispersion minimum by constituting a feedback system as mentioned in the above.

SUMMARY OF THE INVENTION

In the conventional compensation system for polarization mode dispersion, there are some problems in applying it to an actual case. For example, for an O/E converter or a frequency detector, optoelectric circuits are needed which are able to process high speed signals of the same order as the transmitted signals, which causes demerits of the system from the point of production costs or the constitution of the system. In particular, the O/E converter requires a band width in the order of the transmission bit rate (>G bit), and input sensitivity is lowered with the increase in bit rate. Therefore, it is needed to raise input optical power or dividing ratio of an optical coupler, which causes problems such as high cost or loss increase. Further, these component parts are selected according to the bit rate of an optical signal to be transmitted, so that a compensation circuit or component parts are not possible to use in common for the optical signals of different bit rates.

The intensity of the frequency component of Rb/2 to be used as control quantity is varied by the waveform degradation due to polarization mode dispersion, etc. or the mark ratio of a bit pattern to be transmitted, which causes a problem that the intensity of the frequency component of Rb/2 is easily affected by external disturbances. Further, when the amount of polarization mode dispersion of a transmission line approaches a bit width, the distortion of a waveform becomes too large and the intensity of the frequency component of Rb/2 becomes not to correspond to the amount of polarization mode dispersion. Thereby, the feedback control becomes not to work properly.

Therefore, the object of the present invention is to offer a polarization mode dispersion compensator and a compensation method having simple constitution and being strong against external disturbances.

The above-mentioned object can be achieved by a polarization mode dispersion compensator being provided with a compensation circuit for polarization mode dispersion for compensating waveform distortion of an optical signal due to polarization mode dispersion received in an optical transmission line, a degree of polarization measuring circuit for measuring the degree of polarization of the optical signal, and a control circuit for controlling the compensation circuit for polarization mode dispersion based on the obtained degree of polarization. In this place, the word, degree of polarization is used as a concept including some physical quantity expressing the extent of polarization besides the degree of polarization. In other words, the deal of degree of polarization in the circuit constitution is not necessarily the degree of polarization of an optical signal, the above-mentioned physical quantity can be dealt as the degree of polarization as far as it can be converted into the degree of polarization by calculation, etc. Its concrete example will be described later.

To be concrete, for example, a compensation circuit for polarization mode dispersion is constituted with a polarization controller which varies the polarization state of an optical signal and a polarization mode dispersion element connected to the polarization controller. As a polarization mode dispersion element, a polarization maintaining fiber can be used. The degree of polarization measuring circuit can be constituted with a polarization state analyzer for detecting the polarization state of an optical signal and a degree of polarization calculating circuit for calculating the degree of polarization using the polarization information obtained by the polarization state analyzer. There is another constitution, in which the degree of polarization measuring circuit can be constituted with a polarization controller which varies the polarization state of an optical signal, a polarization dependence element connected to the polarization controller and a signal processing circuit for calculating the degree of polarization using the output of the polarization dependence element. It is recommendable to provide an optical band pass filter including the optical signal to be the subject of compensation in its pass band in the preceding stage of the compensation circuit for polarization mode dispersion.

In the compensation method for polarization mode dispersion according to the present invention, at first, the degree of polarization of an optical signal to be transmitted in an optical transmission line is found, and the waveform distortion of the optical signal due to polarization mode dispersion received in the optical transmission line is compensated using the obtained degree of polarization. In this case, the optical signal is so compensated as to make the degree of polarization of the optical signal a desired value. Generally, an optical signal is so compensated that the above-mentioned desired value of the degree of polarization is the maximum value in the optical transmission line. The degree of polarization is naturally restricted by the characteristics of the optical transmission line. Therefore, the maximum value of the degree of polarization mentioned in the above means the maximum value which can be realized with the characteristics of the optical transmission line. Further, it is also possible to find the degree of polarization using at least one of the modulation information such as amplitude, phase, frequency, polarization or a code, which is given to the optical signal beforehand.

In the optical fiber communication system according to the present invention, a plurality of optical transmission devices are connected to each other with optical fibers, and at least one of these devices is provided with a polarization mode dispersion compensator for compensating the waveform distortion of an optical signal due to polarization mode dispersion using the degree of polarization of the optical signal. In the same way, the present invention can be applied to a wavelength division multiplexing transmission system. The optical transmission device used in this place is constituted with an optical receiver connected to the optical transmission line and a polarization mode dispersion compensator for compensating the waveform distortion of an optical signal using the degree of polarization of the optical signal provided in the preceding stage of the optical receiver. Thereby, it is made possible to obtain a polarization mode dispersion compensator and a compensation method for polarization mode dispersion having a simple constitution and being strong against external disturbances.

DETAILED DESCRIPTION OF THE PREFERRED EMBODIMENTS

Before explaining concrete embodiments according to the present invention, typical embodiments according to the present invention will be enumerated.

The first embodiment is a polarization mode dispersion compensator provided with a compensation circuit for polarization mode dispersion for compensating the waveform distortion of an optical signal due to polarization mode dispersion received in an optical transmission line, a degree of polarization measuring circuit for measuring the degree of polarization of the optical signal, and a control circuit for controlling the compensation circuit for polarization mode dispersion based on the obtained degree of polarization.

The second embodiment is a polarization mode dispersion compensator described in the first embodiment in which the compensation circuit for polarization mode dispersion is provided with a polarization controller which varies the polarization state of an optical signal and a polarization mode dispersion element connected to the polarization controller.

The third embodiment is a polarization mode dispersion compensator described in the second embodiment in which the polarization mode dispersion element is a polarization maintaining fiber.

The fourth embodiment is a polarization mode dispersion compensator described in the first embodiment in which the degree of polarization measuring circuit is provided with a polarization state analyzer for detecting the polarization state of an optical signal and a degree of polarization calculating circuit for calculating the degree of polarization using the polarization information obtained by the polarization state analyzer.

The fifth embodiment is a polarization mode dispersion compensator described in the first embodiment in which the degree of polarization measuring circuit is provided with a polarization controller which varies the polarization state of an optical signal, a polarization dependence element connected to the polarization controller and a signal processing circuit for calculating the degree of polarization using the output of the polarization dependence element.

The sixth embodiment is a polarization mode dispersion compensator described in the first embodiment in which an optical band pass filter having a pass band including the optical signal to be the subject of compensation is provided in the preceding stage of the compensation circuit for polarization mode dispersion.

The seventh embodiment shows a compensation method for polarization mode dispersion in which the degree of polarization of an optical signal to be transmitted in an optical transmission line is found and the waveform distortion of the optical signal due to the polarization mode dispersion received in the optical transmission line is compensated using the degree of polarization found in the above.

The eighth embodiment shows a compensation method for polarization mode dispersion described in the seventh embodiment in which the optical signal is so compensated as to make the degree of polarization of the optical signal maximum.

The ninth embodiment shows a compensation method for polarization mode dispersion described in the seventh embodiment in which at least one modulation information selected out of amplitude, phase, frequency, polarization and code is given to the optical signal beforehand, and the degree of polarization is found using the modulation information in the above.

The tenth embodiment is an optical fiber communication system in which a plurality of optical transmission devices are connected to each other with optical fibers and at least one of these optical transmission devices is provided with a polarization mode dispersion compensator for compensating the waveform distortion of an optical signal due to polarization mode dispersion using the degree of polarization of the optical signal transmitted by the optical fibers.

The eleventh embodiment is a wavelength division multiplexing transmission system being constituted with a plurality of first optical transmission devices, a first wavelength division multiplexing optical transmission device with respective ends on a side being connected to the first optical transmission devices, a plurality of second optical transmission devices, a second wavelength division multiplexing optical transmission device with respective ends on a side being connected to the second optical transmission devices and optical transmission lines connecting respective ends on the other side of the first wavelength division multiplexing optical transmission device and the respective ends on the other side of the second wavelength division multiplexing optical transmission device, and at least one of the plurality of the first and the second optical transmission devices is provided with a polarization mode dispersion compensator for compensating the waveform distortion of an optical signal due to polarization mode dispersion using the degree of polarization of the optical signal to be transmitted by the optical transmission line.

The twelfth embodiment is an optical transmission device being provided with an optical receiver connected to an optical transmission line, and a polarization mode dispersion compensator being disposed at the preceding stage of the optical receiver for compensating the waveform distortion of an optical signal due to polarization mode dispersion using the degree of polarization of the optical signal being transmitted by the optical transmission line.

The thirteenth embodiment is an optical transmission device described in the twelfth embodiment in which the polarization mode dispersion compensator is provided with a compensation circuit for polarization mode dispersion for compensating the waveform distortion of an optical signal due to polarization mode dispersion received in the optical transmission line, a degree of polarization measuring circuit for finding the degree of polarization of the above-mentioned optical signal and a control circuit for controlling the compensation circuit for polarization mode dispersion based on the degree of polarization found in the above.

The fourteenth embodiment is an optical transmission device described in the thirteenth embodiment in which an optical band pass filter is provided at the input side of the compensation circuit for polarization mode dispersion.

The fifteenth embodiment is an optical receiver provided with an optoelectric converter for converting an optical signal into an electrical signal connected to an optical transmission line and a compensation circuit for polarization mode dispersion for compensating the waveform distortion of the electrical signal due to polarization mode dispersion in the optical transmission line based on the degree of polarization obtained from the optical signal.

The sixteenth embodiment is an optical receiver described in the fifteenth embodiment in which the compensation circuit for polarization mode dispersion is constituted with an electric transversal filter.

The typical embodiments according to the present invention will be described in detail in the various kinds of embodiments. These embodiments will be explained in detail in the following.

Figure 1:
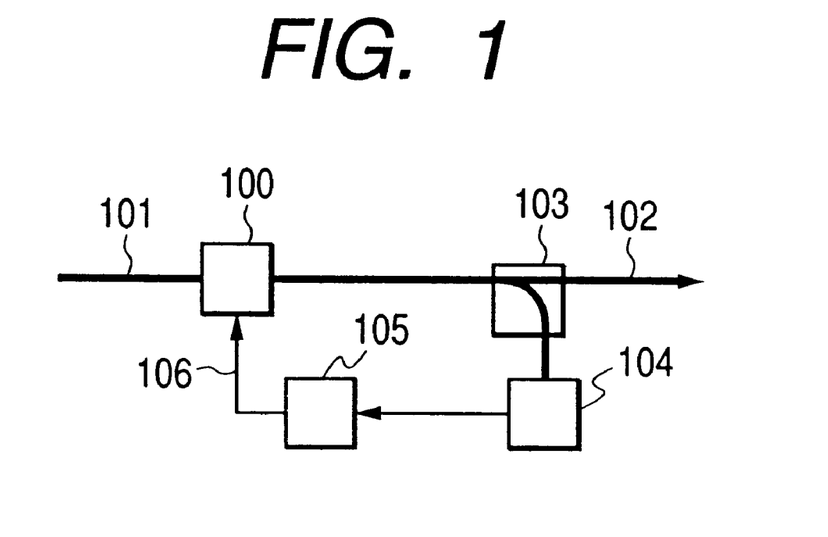
FIG. 1 shows a fundamental block diagram showing a first embodiment of a polarization mode dispersion compensator according to the present invention.

FIG. 1 shows the first embodiment of a polarization mode dispersion compensator according to the present invention. As shown in the figure, the present embodiment is provided with a compensation circuit for polarization mode dispersion 100, a degree of polarization measuring circuit 104 and a control circuit 105. An optical signal is input to the compensation circuit for polarization mode dispersion 100 through an input optical fiber 101 and after receiving the compensation process for polarization mode dispersion, it is output to an output optical fiber 102. A part of the optical signal passes through the output optical fiber 102 is divided by an optical coupler 103 and input to a degree of polarization measuring circuit 104. The degree of polarization measuring circuit 104 is for finding the degree of polarization of the divided optical signal. The control circuit 105 generates a control signal 106 from the degree of polarization obtained in the above and so controls the compensation circuit for polarization mode dispersion 100 as the degree of polarization to be a desired value. The compensation circuit for polarization mode dispersion 100, usually requires a plurality of control parameters (for example, 2 variables of a polarization state and an amount of polarization mode dispersion, etc.), so that the control signal 106 is not always a single electrical signal. By the control as mentioned in the above, always it is made possible to maintain an optimum compensation state even if the polarization state or the amount of polarization mode dispersion of the transmission line is varied. For the circuit elements or other members to be used for the compensation circuit for polarization mode dispersion 100 or the degree of polarization measuring circuit 104 according to the present invention, ordinary ones are good enough. About the concrete constitution of the compensation circuit for polarization mode dispersion 100 and that of the degree of polarization measuring circuit 104 will be described later. When the degree of polarization is controlled to be a desired value as mentioned in the above, in an ordinary case, the compensation circuit for polarization mode dispersion 100 is so controlled as to make the degree of polarization in the transmission line maximum. The meaning of the maximum, in this place, is as described in the above.

The reason why the compensation for polarization mode dispersion can be performed using the degree of polarization is that the value of it corresponds to the degradation quantity of the receiving characteristics. The explanation about it will be given in the following.

Figure 2A:
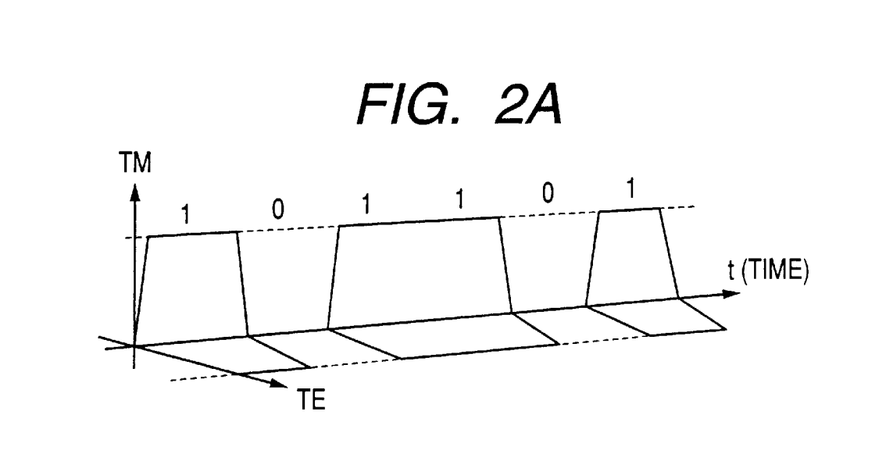
FIG. 2A to FIG. 2D respectively show a waveform state and a polarization state of an optical signal in a case where there is polarization mode dispersion and in a case where there is not.
Figure 2B:
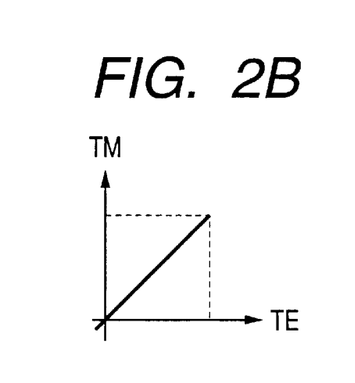
Figure 2C:
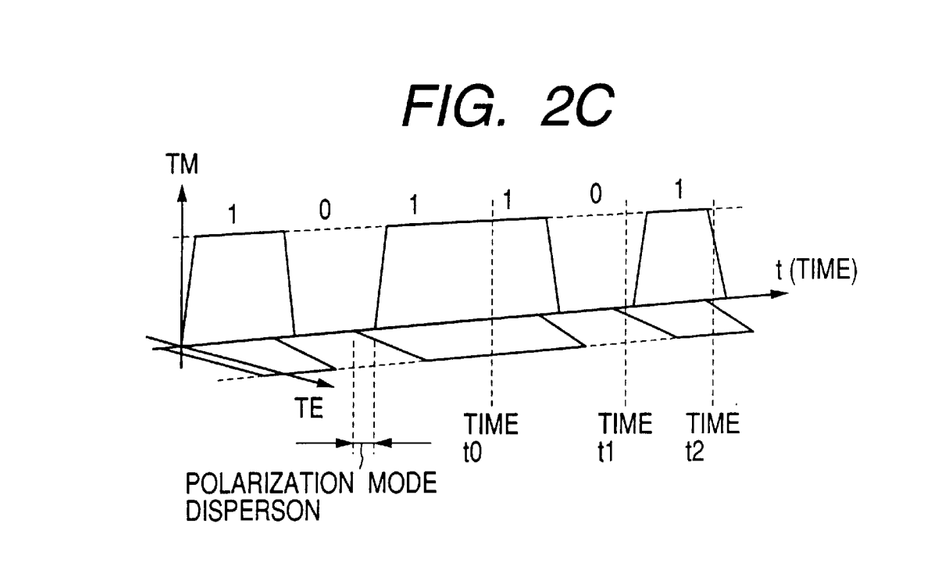
Figure 2D:
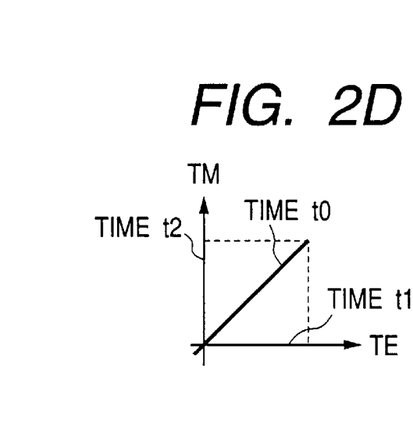

The waveform state and the polarization state of an optical signal, when there is no polarization mode dispersion are shown in FIG. 2A and FIG. 2B, and those states, when there is polarization mode dispersion are shown in FIG. 2C and FIG. 2D. In the figures, the axis of ordinates and the axis of abscissas typically show 2 principal axes (TE/TM) of a transmission line. When there is no polarization mode dispersion in a transmission line, as shown in FIG. 2A, the power of an optical signal is transmitted being divided into 2 principal axes almost 1:1, so that there occurs no deviation of waveforms from each other, and the polarization state formed in composing the 2 is kept single as shown in FIG. 2D. In contrast to this, when there is polarization mode dispersion in the transmission line, as shown in FIG. 2C, bit slip is generated by the polarization mode dispersion ΔT, and at 3 points of time, t0, t1 and t2, the polarization states are different from each other. For example, at the time t1 and t2, as shown in FIG. 2D, the optical signal of only one component, TE or TM exists, so that the polarization state at the time of t1 or t2 is different from that at the time of t0. Therefore, when there is polarization mode dispersion, an optical signal cannot be a signal of pure single polarization, and the degree of polarization is lowered. In FIG. 2A to FIG. 2D, an example in which 2 components are composed into a signal of linear polarization is shown, and also in the case of elliptical polarization, degradation in the degree of polarization occurs in the same way. In the case of an actual optical signal, although the optical phase in a bit is not constant, degradation in the degree of polarization by polarization mode dispersion also occurs. The present invention can be naturally applied to the case of elliptical polarization, etc.

Figure 3:
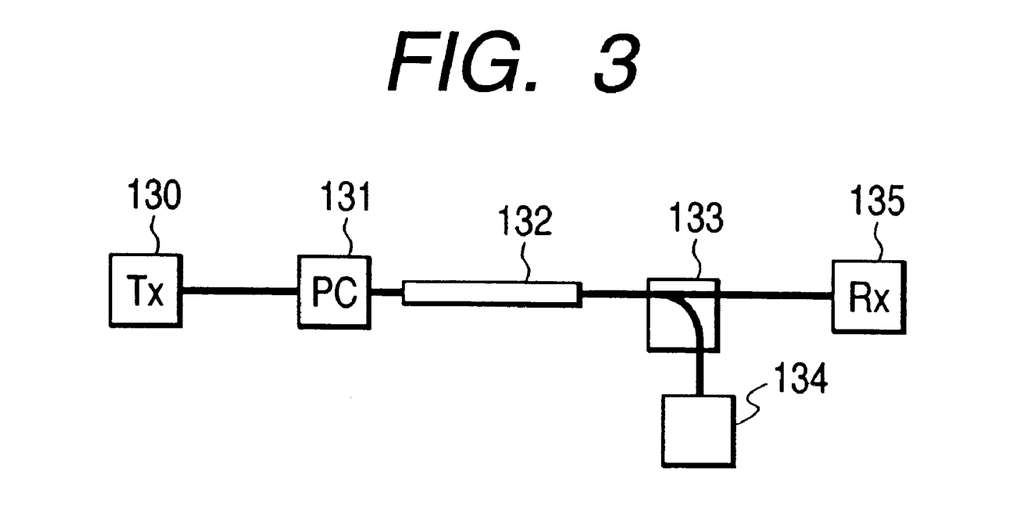
FIG. 3 shows a fundamental block diagram of a system used for deriving the relation between the error rate and the degree of polarization of an optical signal affected by polarization mode dispersion.

FIG. 3 shows the block diagram of a system used for finding the relation between the error rate and the degree of polarization of an optical signal affected by polarization mode dispersion.

Figure 4A:
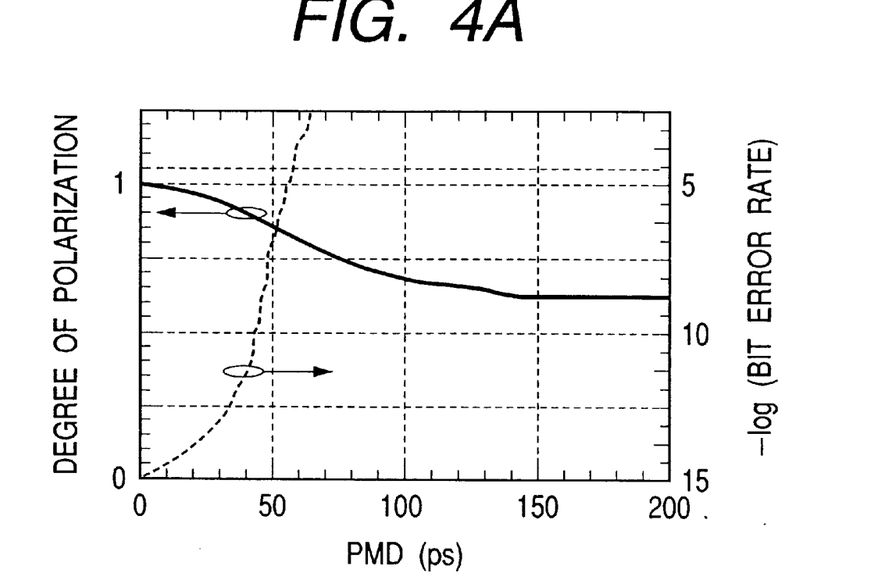
FIG. 4A and FIG. 4B respectively show the relation between the error rate and the degree of polarization of an optical signal affected by polarization mode dispersion.
Figure 4B:
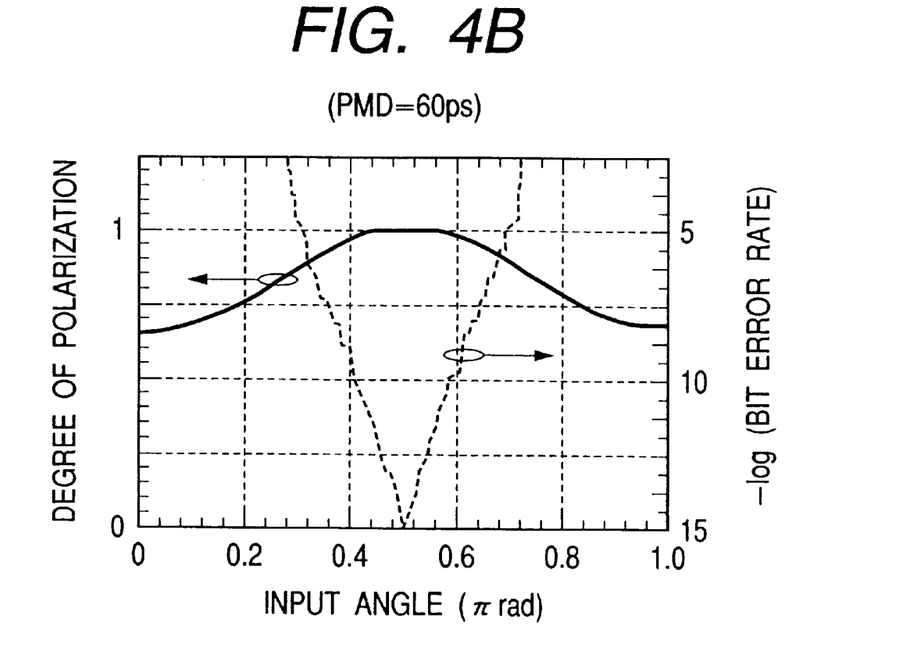

FIG. 4A and FIG. 4B show the relation between the error rate and the degree of polarization of an optical signal affected by polarization mode dispersion obtained using the system shown in FIG. 3. In FIG. 3, the optical transmitter 130 transmits an optical signal of single polarization being intensity-modulated at a bit rate of 10 Gbit/s. A polarization controller (PC) varies the polarization state of an optical signal input to a polarization maintaining fiber 132 with polarization mode dispersion. An optical coupler 133 divides a part of the optical signal to be output to the receiver 135. The degree of polarization of the divided optical signal is measured by the degree of polarization detector 134. In this place, 2 items shown in the following were calculated: the degree of polarization, the output of the degree of polarization detector 134, and the code error rate observed by the receiver 135.

FIG. 4A shows the result of a case where an optical signal divided into 1:1 in the power ratio are input onto the 2 principal axes of the polarization maintaining fiber 132 shown in FIG. 3 and the amount of polarization mode dispersion of the polarization maintaining fiber 132 is varied. As shown in this figure, when polarization mode dispersion (PMD) is zero, the degree of polarization becomes maximum and the error rate becomes minimum, and it shows that with the increase in the amount of polarization mode dispersion, the error rate is degraded and the degree of polarization is lowered. It also shows that even when the amount of PMD exceeds 100 ps, the bit width of a signal being transmitted, the degree of polarization correctly corresponds to the error rate. On the other hand, FIG. 4B shows the result in a case where the amount of PMD is fixed to 60 ps and the incident angle of a polarization plane of an optical signal input to the polarization maintaining fiber 132 is varied. In this case also, the correspondence between the degree of polarization and the error rate holds correctly, for example, the degradation due to polarization mode dispersion can be kept to a minimum by controlling the degree of polarization to a maximum.

In the above example of calculation, the transmission of NRZ system (Non Return to Zero) is assumed; however, the present invention is applicable to other coding system or modulation system. For example, the invention can be applied to the RZ (Return to Zero) system, the duo-binary system, Manchester system, or multi-level coding system, further it can be applied to the direct modulation system by laser or external modulator. When the phase, polarization state or optical frequency, etc. are modulated in every bit, theoretically the degradation in the degree of polarization is generated due to polarization mode dispersion in the bits being transmitted, so that the present invention can be applied to other modulation system than the intensity modulation.

Figure 5:
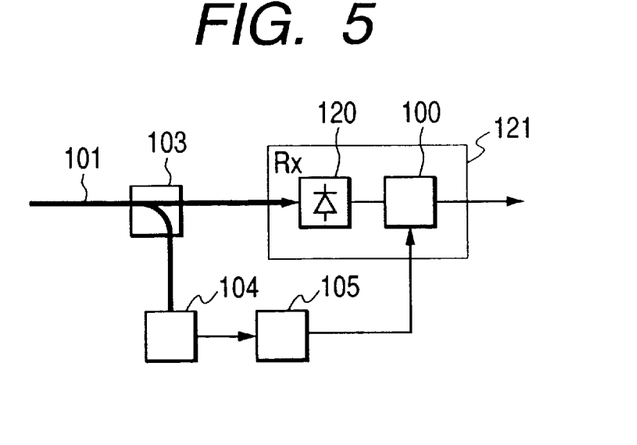
FIG. 5 shows a fundamental block diagram showing a second embodiment of a polarization mode dispersion compensator according to the present invention.

FIG. 5 shows the second embodiment of a polarization mode dispersion compensator according to the present invention. In the present embodiment, as shown in the figure, the optical receiver (Rx) 121 is connected to the input optical fiber 101. The optical receiver 121 comprises an optoelectric (O/E) converter 120 for converting an optical signal coming from the input optical fiber 101 into an electrical signal and an compensation circuit for polarization mode dispersion 100 being connected to the above-mentioned optoelectric converter 120. On the other hand, the input optical fiber 101 is provided with an optical coupler 103, and the degree of polarization of the optical signal which is divided with the above-mentioned optical coupler 103 is found by the degree of polarization measuring circuit 104. The control circuit 105 controls the compensation circuit for polarization mode dispersion 100 using the degree of polarization information obtained by the degree of polarization detector 104. As the compensation circuit for polarization mode dispersion 100, for example, a variable electric transversal filter, etc. can be used.

Figure 6:
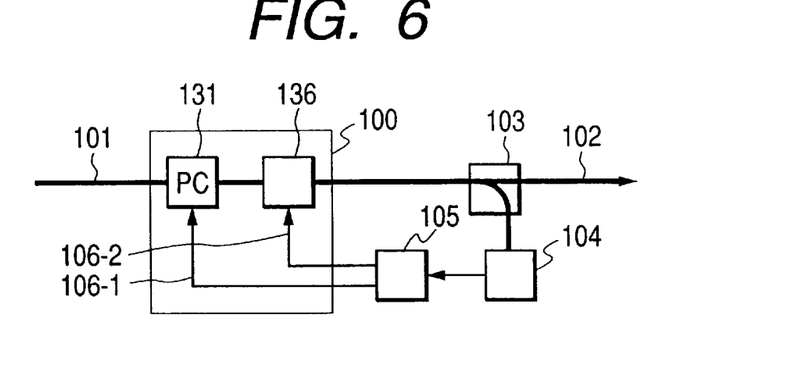
FIG. 6 shows a fundamental block diagram showing a third embodiment of a polarization mode dispersion compensator according to the present invention.

FIG. 6 shows the third embodiment of a polarization mode dispersion compensator according to the present invention. In the present embodiment, the compensation circuit for polarization mode dispersion 100 shown in FIG. 1 in the first embodiment is replaced with a polarization controller 131 and a variable polarization mode dispersion element 136. The control circuit 105 controls the polarization controller 131 by a control signal 106-1 using the degree of polarization information obtained in the degree of polarization detector 104, and also controls the variable polarization mode dispersion element 136 by a control signal 106-2. Thereby, in the present embodiment, each of these 2 parameters, the compensation quantity for polarization mode dispersion and the polarization state input to the compensation circuit, can be controlled independently from each other, so that even in a case where polarization mode dispersion in the transmission line is large, almost complete compensation effect can be obtained.

Figure 7:
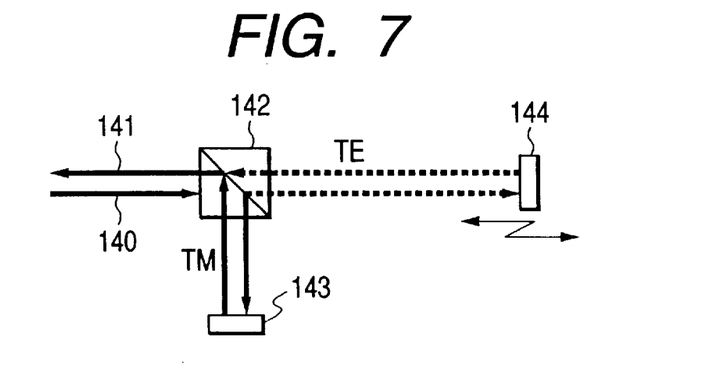
FIG. 7 shows an example of a block diagram of a variable polarization mode dispersion element.

FIG. 7 shows an example of the constitution of the variable polarization mode dispersion element 136 being used in the third embodiment. In the present embodiment, as shown in the figure, input light 140 is divided into the components in the direction of 2 principal axes TE/TM of the polarization beam splitter 142 and after they are reflected on the movable mirror 144 and a fixed mirror 143, they are composed by the polarization beam splitter 142 and it is output as an output light 141. In the present embodiment, the distance between the movable beam splitter 144 and the polarization beam splitter 142 is made variable, whereby it is made possible to make the amount of polarization mode dispersion variable. Fundamentally, a variable polarization mode dispersion element having other constitution than that described in the above can be applied to the present system.

As the polarization controller 131, a variety of systems such as a constitution in which wavelength plates are rotated, a constitution in which a variable wavelength plate of fiber compression or liquid crystal being used or a constitution using electro-optical effect are well known to the public, and fundamentally any system mentioned in the above can be applied to the present system.

Figure 8:
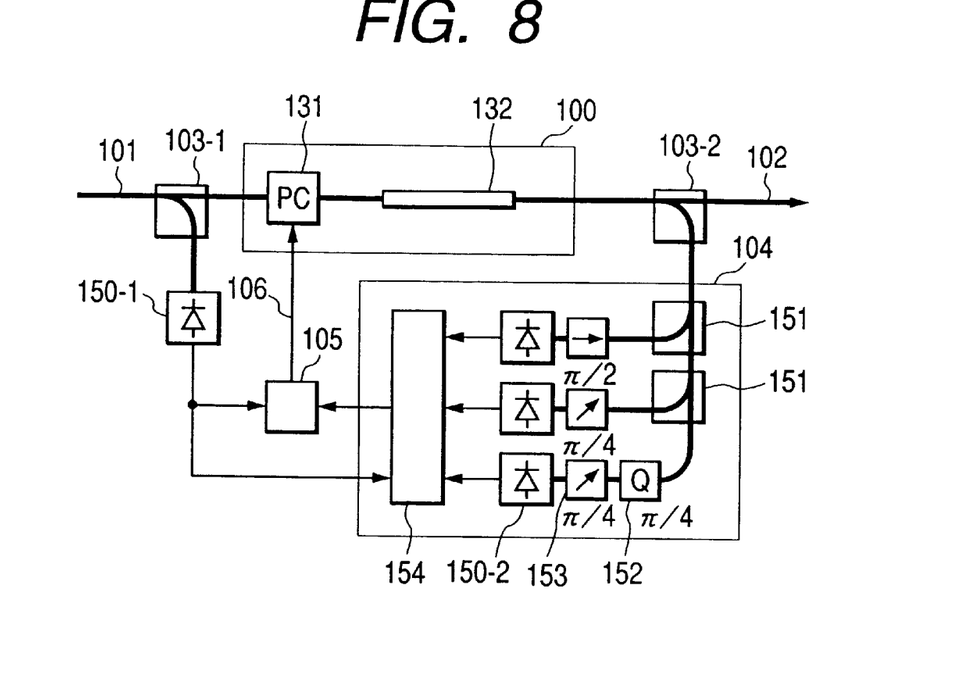
FIG. 8 shows a fundamental block diagram showing a fourth embodiment of a polarization mode dispersion compensator according to the present invention.

FIG. 8 shows the fourth embodiment of a polarization mode dispersion compensator according to the present invention. In the present embodiment, the compensation circuit for polarization mode dispersion 100 is constituted with a polarization controller (PC) 131 and a polarization maintaining fiber 132, and in the preceding stage and the following stage of the compensation circuit for polarization mode dispersion 100, optical couplers, 103-1 and 103-2 are provided respectively. Generally, it is not possible to make the polarization mode dispersion amount of the polarization maintaining fiber 132 variable and only partial compensation is possible; however, in the case of the present embodiment the constitution can be simplified in comparison with the cases of the embodiments written in the above. Further, in the present embodiment, a part of the optical signal from the input optical fiber 101 is divided by the optical coupler 103-1 to monitor the intensity of the input light by an optical detector 150-1. Thereby, when the intensity of the optical signal is lower than a predetermined value, it is possible to stop the operation of the control circuit 105.

In the present embodiment shows an example in which a polarization state analyzer is used as the degree of polarization measuring circuit 104. The polarization state analyzer is an optical circuit composed of the combination of beam splitters 151 for dividing an optical signal, a ¼ wavelength plate 152, polarization analyzers 153 and optical detectors 150-2. Respective optical detectors 150-2 detect a part of polarization information of the optical signal. The degree of polarization calculating circuit 154 calculates the degree of polarization using the information from the detectors and the total light intensity information obtained from the optical detector 150-1, and outputs the value to the control circuit 105. The constitution of the polarization state analyzer shows an example, and it is possible to use an optical circuit of the other type if it is able to detect the degree of polarization or the equivalent information.

Figure 9:
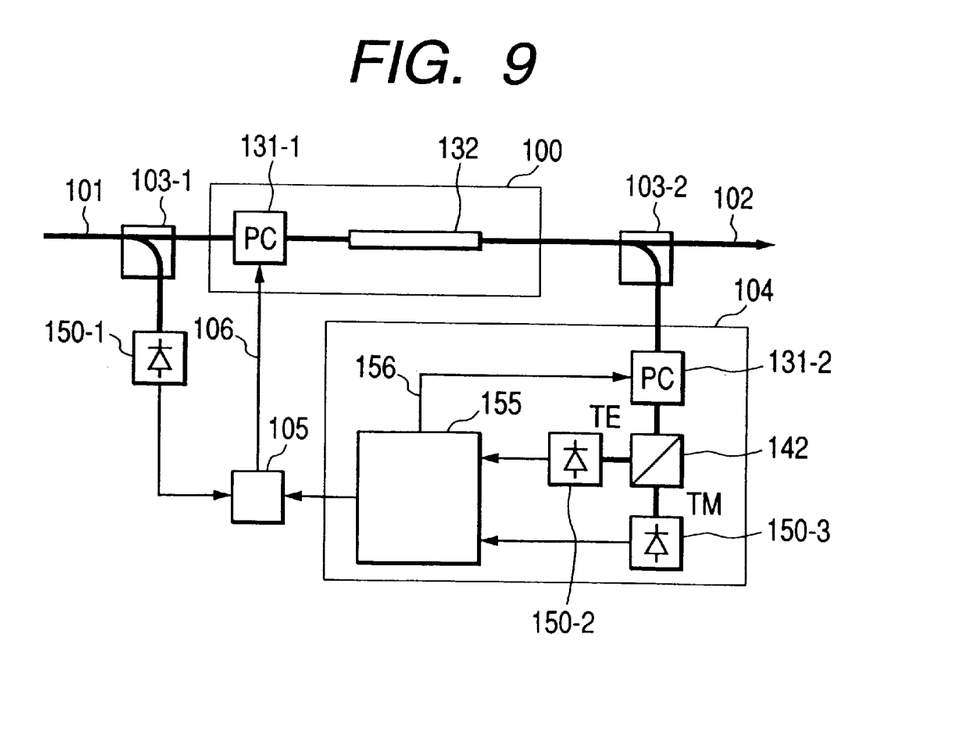
FIG. 9 shows a fundamental block diagram showing a fifth embodiment of a polarization mode dispersion compensator according to the present invention.

FIG. 9 shows the fifth embodiment of the polarization mode dispersion compensator according to the present invention. In the present embodiment, the degree of polarization measuring circuit 104 comprises a different constitution from that shown in the fourth embodiment. The degree of polarization measuring circuit 104 in the present embodiment is constituted with a polarization controller (PC) 131-2, a polarization beam splitter 142 being a polarization dependence element and optical detectors, 150-2 and 150-3. As shown in the figure, a part of the output light of the compensation circuit for polarization mode dispersion 100 is divided by the optical coupler 103-2, and after that it passes through the polarization controller 131-2, and then divided into TE/TM components by the polarization beam splitter 142. The light intensity of each component is detected by the optical detector 150-2 or 150-3. The signal processing circuit 155, using the above information, performs control of the polarization controller 131-2 and calculation process of the degree of polarization. For example, the polarization controller 131-2 is controlled using a control signal 156 to make the output of the optical detector 150-2 maximum, which monitors the light of TE component. In this case, a signal obtained from the optical detector 150-3 corresponds to the degree of polarization of the optical signal. For example, when the degree of polarization is high, most of the light is converted to the TE direction of the polarization beam splitter 142, and the quantity of TM component decreases and the output of the optical detector 150-3 is lowered. Therefore, when the compensation circuit for polarization mode dispersion 100 is controlled to make the output of the optical detector 150-3 minimum, it is made possible to control the degradation due to polarization mode dispersion minimum.

Besides this, for example, the output itself of the optical detector 150-2 can be used for the control. When the ratio between such a signal and the output of the polarizer 150-1 is used for the control, it is possible to perform the control which does not depend on the input light intensity. Further, the polarization dependence element is not limited to the polarization beam splitter 142, and for example, if the loss or gain of an element is varied corresponding to the polarization state as in the case of a polarizer, the application of the element is widely possible. For the correct operation of the present embodiment, it is desirable to make the time constant of the control by the polarization controller 131-2 is set enough smaller than that by the polarization controller 131-1 in order to separate these 2 control operations.

Figure 10:
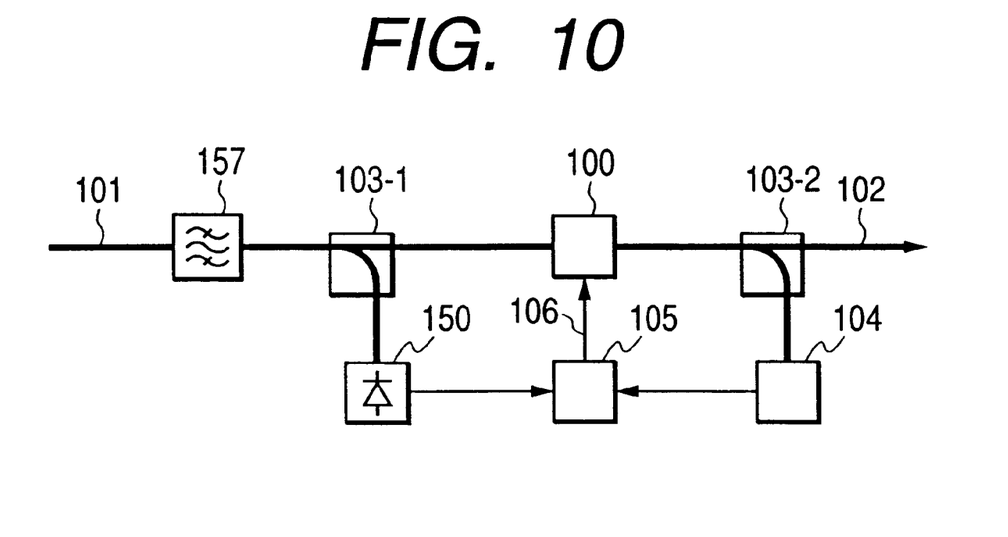
FIG. 10 shows a fundamental block diagram showing a sixth embodiment of a polarization mode dispersion compensator according to the present invention.

FIG. 10 shows the sixth embodiment of the polarization mode dispersion compensator according to the present invention. In the present embodiment, an optical band pass filter 157 is provided at the input portion of the compensation circuit for polarization mode dispersion 100. The reason is mentioned in the following. The degree of polarization of an optical signal is influenced by also other parameters than the polarization mode dispersion, and it is necessary to control the influences of such parameters minimum. For example, the amplified spontaneous emission light emitted from optical amplifiers which are widely used for optical fiber transmission is non-polarized light, so that when the quantity of it increases, the degree of polarization of the signal light can be lowered and there is a possibility that it influences the operation of the control circuit according to the present invention. Therefore, by providing the optical band pass filter 157, the amplified spontaneous emission light having a wide band width can be eliminated from the optical signal to be the subject of compensation, which makes it possible to perform high precision measurement of the degree of polarization. When the optical band pass filter is inserted in a stage previous to the degree of polarization measuring circuit 104, the filter is effective even if it is disposed at the other position than that shown in the present embodiment.

Figure 11:
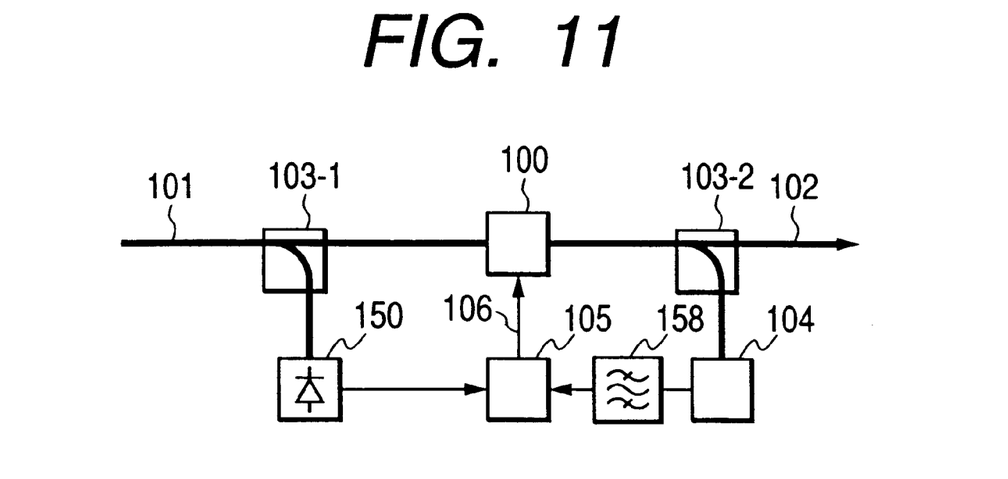
FIG. 11 shows a fundamental block diagram showing a seventh embodiment of a polarization mode dispersion compensator according to the present invention.

FIG. 11 shows the seventh embodiment of the polarization mode dispersion compensator according to the present invention. In the present embodiment the detection of the degree of polarization is performed utilizing a modulation component superimposed on the optical signal. Assuming that an optical signal is amplitude-modulated by a sinusoidal signal of frequency f with a small amplitude, and the component of frequency f is extracted from the output of the degree of polarization measuring circuit 104 with the band pass filter 158. The control circuit 105 controls the compensation circuit for polarization mode dispersion 100 with the control signal 106 based on the intensity information mentioned in the above. By such an operation the signal component is separated from the external disturbance components such as the amplified spontaneous emission light from optical fiber amplifiers; thereby, it is made possible to accurately measure the degree of polarization.

As a means for discrimination, besides the band pass filter 158, a method of performing synchronous detection at the degree of polarization measuring circuit 104 is also applicable. Besides the amplitude modulation of the transmission signal, modulation methods such as phase, frequency, polarization, code, etc. are applicable. It is possible to use in common the FM modulation component of a light source used for the suppression of SBS (Stimulated Brillouin Scattering), and it is also possible to use the intensity of frame frequency component of SONET/SDH, etc. or the detection synchronized with a predetermined pattern in a frame, etc.

Figure 12:
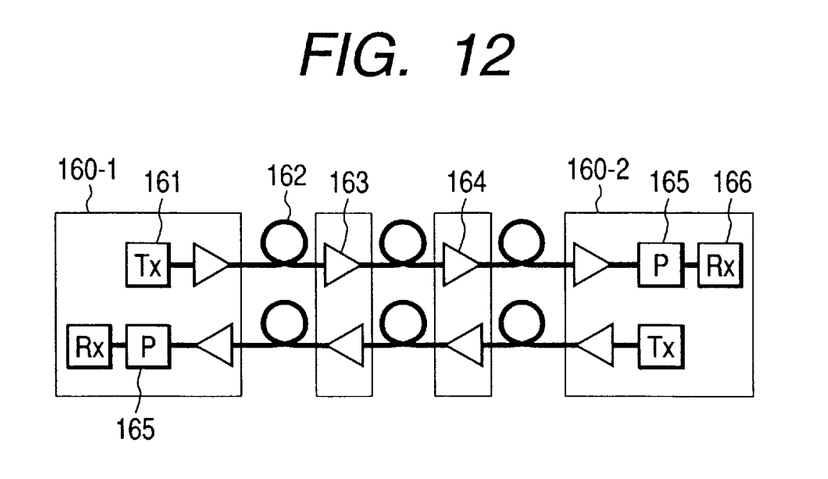
FIG. 12 shows a block diagram showing an embodiment of an optical fiber communication system being applied with a polarization mode dispersion compensator according to the present invention.

FIG. 12 shows an embodiment of an optical fiber communication system being applied with the polarization mode dispersion compensator according to the present invention. As shown in the figure, in the present embodiment, an optical transmission device 160-1 and an optical transmission device 160-2 are connected with 2 up and down optical fiber transmission lines 162. In each of the optical fiber transmission lines 162, an optical amplifier 163 and an optical repeater 164 are provided. Respective optical transmission devices, 160-1 and 160-2 comprise optical transmitters (Tx) 161 and optical receivers (Rx) 166. In the preceding stage of the each of the optical receivers 166, a polarization mode dispersion compensator 165 according to the present invention is provided. By disposing the polarization mode dispersion compensator at the preceding stage of the optical receiver, the polarization mode dispersion compensation for the whole transmission line is possible; however, there is no need to provide the same number of polarization mode dispersion compensators 165 at the same positions as those in the present embodiment, for example, it is effective to dispose the polarization mode dispersion compensator only in an optical fiber transmission line which is known to have a large amount of polarization mode dispersion, only in an optical transmission device just behind an optical element or only in the up line or the down line.

Figure 13:
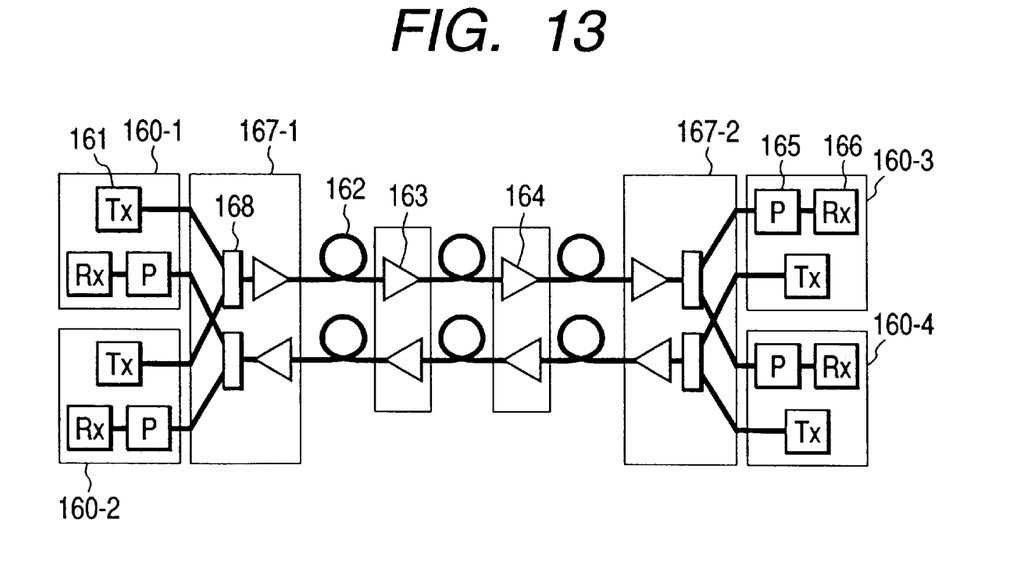
FIG. 13 shows a block diagram showing an optical wavelength division multiplexing transmission system being applied with a polarization mode dispersion compensator according to the present invention.

FIG. 13 shows an optical wavelength division multiplexing transmission system to which the polarization mode dispersion compensator according to the present invention is applied. In the present embodiment, as shown in the figure, wavelength division multiplexing optical transmission devices, 167-1 and 167-2, are connected by 2 up and down optical fiber transmission lines. Each of these optical fiber transmission lines 162 is provided with an optical amplifier 163 and an optical repeater 164. Each of the wavelength division multiplexing optical transmission devices, 167-1 and 167-2, is provided with wavelength combiner/separators 168. Optical transmission devices, 160-1 and 160-2 are connected to the wavelength division multiplexing optical transmission device 167-1, and optical transmission devices, 160-3 and 160-4, are connected to the wavelength division multiplexing optical transmission device 167-2. Each of the optical transmission devices is provided with an optical transmitter (Tx) 161 and an optical receiver (Rx) 166. In the preceding stage of each receivers 166, a polarization mode dispersion compensator 165 is provided. In general, as shown in the present embodiment, it is needed to provide one polarization mode dispersion compensator 165 for each optical signal; however, in a case where the wavelength spacing between optical signals is small and the signals are transmitted in making the polarization states of both signals coincide with each other, it is possible to use a polarization mode dispersion compensator in common. About the number or the positions of polarization mode dispersion compensators 165, as mentioned in the above, there is no need that they coincide with those in the present embodiment.

As mentioned in the above, in the present invention, the control over the compensation circuit for polarization mode dispersion is executed using the degree of polarization information of an optical signal to be transmitted, so that optoelectric circuits for processing high speed signals are not needed, which makes it possible to reduce the manufacturing cost and to simplify the constitution of the polarization mode dispersion compensator. The band width of the degree of polarization measuring circuit can be narrow enough in comparison with the bit rate and a detection circuit of high sensitivity can be constituted, so that the dividing ratio of an optical coupler can be made small, which makes it possible to decreases the loss in the main signal system. Further, there is an effect that since the degree of polarization does not depend on optical power, fundamentally a wide dynamic range of measurement can be obtained, which decreases the influence upon the design of a main signal line.

In the present invention, it is possible to know the quantity of degradation due to polarization mode dispersion independent of the bit rate of a main signal, modulation formats such as RZ/NRZ, etc., kinds of modulators or the methods of modulation, which is beneficial to expedite the common use of parts or to lower the manufacturing cost. Further the influence caused by the change in the waveform or in the mark ratio of a bit pattern is small, and it is characterized by a point that it is strong against external disturbances. Moreover, even in a case where the amount of polarization mode dispersion exceeds the bit width of a transmission signal, a correct control signal can be obtained; thereby, it is made possible to compensate a large amount of polarization mode dispersion.

The control method of a compensation circuit for polarization mode dispersion can be realized, for example, by performing well adapted control to make the degree of polarization maximum, and it is made possible to perform well adapted compensation corresponding the change in the amount of polarization mode dispersion or polarization state of a transmission line. It is made possible to measure the degree of polarization quickly by using a polarization state analyzer as a degree of polarization measuring circuit, and a detection circuit of a small size and simple constitution can be realized. The degree of polarization can be measured, for example, by an optical circuit composed of the combination of polarization controller and a polarization dependent element such as a polarizer; thereby, it is made possible to develop the detection portion to be further small sized and to have further simple constitution.

The compensation circuit for polarization mode dispersion is made possible to perform an ideal compensation in which the degradation due to polarization mode dispersion can be made almost zero by using, for example, a polarization controller and a variable polarization mode dispersion element. It is also made possible to perform compensation for polarization mode dispersion of an amount so large as to exceed the bit length by increasing the quantity of variation of the variable polarization mode dispersion element. When the polarization maintaining fiber is used as a fixed polarization mode dispersion element, in particular, the constitution can be simplified.

It is made possible to obtain the degree of polarization in high precision in removing the influence of external disturbances by using an optical band pass filter having a pass band including an optical signal to be a subject of compensation, and further by using the modulation information such as amplitude, phase, frequency, polarization or code which is given to the optical signal beforehand.

It is made possible to greatly enlarge the transmission distance or application range by applying the polarization mode dispersion compensator according to the present invention to an optical transmission device, a wavelength division multiplexing transmission device, an optical fiber communication system or a wavelength division multiplexing transmission system.

According to the present invention, it is possible to obtain a polarization mode dispersion compensator and a compensation method for polarization mode dispersion having simple constitution and being strong against external disturbances.

What is claimed is:

1. A polarization mode dispersion compensator comprising: a compensation circuit for polarization mode dispersion for compensating the waveform distortion of an optical signal due to polarization mode dispersion, a degree of polarization measuring circuit for finding the degree of polarization of the optical signal and a control circuit for controlling said compensation circuit for polarization mode dispersion based on said degree of polarization obtained in the above, wherein said compensator includes an optical band pass filter having a pass band including the optical signal to be the subject of compensation being disposed in the preceding stage of said compensation circuit for polarization mode dispersion.

2. A compensation method for polarization mode dispersion for finding the degree of polarization of an optical signal to be transmitted by an optical transmission line and for compensating the waveform distortion of the optical signal due to the polarization mode dispersion received in said optical transmission line using said degree of polarization, wherein said optical signal is modulated with at least one modulation information among amplitude, phase, frequency, polarization or code, and said degree of polarization is found using said modulation information.

3. A compensation method according to claim 2, wherein said optical signal is a signal data modulated optical signal which is modulated with the at least one modulation information to enable obtaining of the degree of polarization.

4. A compensation method according to claim 2, wherein the optical signal is amplitude-modulated by the modulation information in a form of a sinusoidal signal of frequency f with a small amplitude, wherein a component of frequency f is extracted as an indication of said degree of polarization.

5. An optical transmission device comprising: an optical receiver connected to an optical transmission line, and a polarization mode dispersion compensator, being disposed in a previous stage of said optical receiver, for compensating the waveform distortion of an optical signal due to polarization mode dispersion using a degree of polarization of the optical signal transmitted by said optical transmission line, wherein said polarization mode dispersion compensator is provided with a compensation circuit for polarization mode dispersion for compensating the waveform distortion of an optical signal due to polarization mode dispersion, a degree of polarization measuring circuit for finding the degree of polarization of said optical signal, and a control circuit for controlling said compensation circuit for polarization mode dispersion based on the decree of polarization obtained by the degree of polarization measuring circuit, wherein an optical band pass filter is provided on the input side of said compensation circuit for polarization mode dispersion.

* * * * *